United States Patent
Monbaliu et al.

(10) Patent No.: US 12,010,951 B2
(45) Date of Patent: Jun. 18, 2024

(54) ARRANGEMENT OF TWINE TENSIONERS FOR AN AGRICULTURAL BALER

(71) Applicant: CNH Industrial America LLC, New Holland, PA (US)

(72) Inventors: Sven Monbaliu, Zuienkerke (BE); Kenny Maelfeyt, Vlissegem (BE)

(73) Assignee: CNH Industrial America LLC, New Holland, PA (US)

( * ) Notice: Subject to any disclaimer, the term of this patent is extended or adjusted under 35 U.S.C. 154(b) by 807 days.

(21) Appl. No.: 16/516,466

(22) Filed: Jul. 19, 2019

(65) Prior Publication Data
US 2020/0022311 A1    Jan. 23, 2020

(30) Foreign Application Priority Data

Jul. 19, 2018    (BE) .................................. 2018/5523

(51) Int. Cl.
| | | |
|---|---|---|
| *A01F 15/14* | (2006.01) | |
| *A01F 15/12* | (2006.01) | |
| *B65B 13/26* | (2006.01) | |

(52) U.S. Cl.
CPC ............ *A01F 15/145* (2013.01); *A01F 15/12* (2013.01); *B65B 13/26* (2013.01)

(58) Field of Classification Search
CPC ........ A01F 15/145; A01F 15/12; A01F 15/04; A01F 15/08; A01F 15/0858; A01F 15/14; A01F 2015/0666; B65B 13/26; B60G 2300/08; A01D 59/04; A01D 59/06; B65H 69/04
USPC ........................................ 53/399; 100/17–23
See application file for complete search history.

(56) References Cited

U.S. PATENT DOCUMENTS

| | | | | |
|---|---|---|---|---|
| 4,490,968 A | * | 1/1985 | Cysewski | ............... A01F 15/00 56/343 |
| 4,500,139 A | * | 2/1985 | Tucek | .................. B62D 55/116 305/128 |
| 6,450,524 B1 | * | 9/2002 | Lippens | ................. A01B 73/00 280/445 |
| 6,651,418 B1 | * | 11/2003 | McClure | ............... A01F 15/106 56/364 |

(Continued)

FOREIGN PATENT DOCUMENTS

| | | |
|---|---|---|
| DE | 4116619 A1 | 11/1992 |
| EP | 1234495 A1 | 8/2002 |

(Continued)

OTHER PUBLICATIONS

Extended European Search Report for EP Application No. 19185852.1 dated Nov. 22, 2019 (five pages).

*Primary Examiner* — Andrew M Tecco
(74) *Attorney, Agent, or Firm* — Peter K. Zacharias; Rebecca L. Henkel; Rickard D. DeMille

(57) ABSTRACT

An agricultural baler including a chassis, an axle system, a main bale chamber carried by the chassis, and a tying assembly configured for tying a twine around a bale within the main bale chamber. The tying assembly includes a plurality of knotters supported by the chassis, a needle yoke having a plurality of needles coupled thereto, an upper tensioner device, and a lower tensioner device located underneath the upper tensioner device. The axle system includes a first axle, and the lower tensioner device is attached to the first axle and correspondingly moves with the first axle.

15 Claims, 6 Drawing Sheets

(56) References Cited

U.S. PATENT DOCUMENTS

| | | | |
|---|---|---|---|
| 7,878,557 B2* | 2/2011 | Eylenbosch | A01F 15/145 |
| | | | 289/5 |
| 8,671,834 B1* | 3/2014 | Rotole | B65H 59/36 |
| | | | 100/32 |
| 2002/0066264 A1* | 6/2002 | Bergkamp | A01F 15/101 |
| | | | 56/341 |
| 2004/0134360 A1* | 7/2004 | Rotole | B30B 9/3003 |
| | | | 100/32 |
| 2009/0250930 A1* | 10/2009 | Eylenbosch | A01F 15/145 |
| | | | 289/2 |
| 2016/0023695 A1* | 1/2016 | Obermeier-Hartmann | |
| | | | B62D 55/06 |
| | | | 180/9.54 |
| 2017/0135285 A1* | 5/2017 | Naaktgeboren | A01F 15/042 |
| 2018/0077871 A1* | 3/2018 | Maelfeyt | A01F 15/0858 |
| 2020/0215918 A1* | 7/2020 | Olander | A01D 85/005 |
| 2021/0114428 A1* | 4/2021 | Demon | B60G 11/04 |

FOREIGN PATENT DOCUMENTS

| | | |
|---|---|---|
| EP | 2737789 A2 | 6/2014 |
| WO | 2010/136501 A1 | 12/2010 |

* cited by examiner

ARRANGEMENT OF TWINE TENSIONERS FOR AN AGRICULTURAL BALER

FIELD OF THE INVENTION

The present invention relates to agricultural balers, and, more particularly, to twine tensioners used with such balers.

BACKGROUND OF THE INVENTION

Agricultural harvesting machines, such as balers, are used to consolidate and package crop material so as to facilitate the storage and handling of the crop material for later use. In the case of hay, a mower-conditioner is typically used to cut and condition the crop material for windrow drying in the sun. In the case of straw, an agricultural combine discharges non-grain crop material from the rear of the combine defining the straw (such as wheat or oat straw) which is to be picked up by the baler. The cut crop material is typically raked and dried, and a baler, such as a large square baler or round baler, straddles the windrows and travels along the windrows to pick up the crop material and form it into square or round bales.

On a large square baler, a pickup unit at the front of the baler gathers the cut and windrowed crop material from the ground. The pickup unit includes a pickup roll, and optionally may include other components such as side shields, stub augers, wind guard, etc.

A packer unit is used to move the crop material from the pickup unit to a feeding channel (also known as a "pre-compression chamber"). The packer unit forms a wad of crop within the feeding channel which is then transferred to a main bale chamber. (For purposes of discussion, the charge of crop material within the feeding channel will be termed a "wad", and the charge of crop material after being compressed within the main bale chamber will be termed a "flake"). Typically, such a packer unit includes packer tines or forks to move the crop material from the pickup unit into the feeding channel. Instead of a packer unit, it is also known to use a rotor cutter unit which chops the crop material into smaller pieces.

A stuffer unit transfers the wad of crop material from the feeding channel to the main bale chamber. Typically, such a stuffer unit includes stuffer forks which are used to move the wad of crop material from the feeding channel to the main bale chamber, in sequence with the reciprocating action of a plunger within the main bale chamber.

In the main bale chamber, the plunger compresses the wad of crop material into flakes to form a bale and, at the same time, gradually advances the bale toward the outlet of the bale chamber. Once the bale reaches a full (or other predetermined) size, a knotter cycle begins in order to bind the bales in their rectangular form.

In the knotter cycle, a series of twine loops, formed from upper and lower twine runs, are wrapped lengthwise around the bales by way of respective knotters, needles, and upper and lower tensioning devices which respectively keep each respective run of twine taught. The knotters, which are generally located at the top of the main bale chamber, include rotating billhooks for tying each respective run of twine together. The needles, which are generally located below the main bale chamber, transport the lower run of twine up to the knotters. The needles are coupled to a needle yoke which pivots the needles in an arcuate travel path in between a lowered and raised position. The upper and lower tensioners can include tension arms, springs, and cogs for aiding in the controlled release of the respective runs of twine as they are pulled from respective upper and lower twine supply rolls. The upper tensioners are connected adjacent to the top of the main bale chamber, and the lower tensioners are connected to the frame at a location adjacent to the bottom of the main bale chamber.

During the knotter cycle, once the bale has reached a desired size, the needles transport the lower runs of twine up to the level of the upper runs of twine and introduce both runs of twine to the knotters, which tie two knots in order to tie-off the loops of a prior bale and commence new loops for a subsequent bale. In this regard, as a bale is formed and becomes larger, moving rearwardly toward the outlet of the mane bale chamber, the loops of twine begin to wrap around the end of the bale. Then, the needles transport the lower runs of twine upwardly and the process repeats itself. After the bale is tied, the bale is ejected out of the rear of the baler.

Large square balers typically include tandem axles to support the weight of the baler and the bales within the baler. The tandem axles are usually coupled to the chassis of the baler by way of an inverted "Y" or yoke arrangement at the ends of the axles, with the apex of the yoke being pivotally coupled to the chassis of the baler. This mechanical interconnection between the axles allows the axles to move together as the baler traverses over uneven ground. These types of tandem axle arrangements can also be called a "bogie". Such an axle arrangement works well to traverse uneven ground, but it can increase the overall height of the baler. For some applications, it may be desirable to use larger diameter tires on the baler, and the combination of the larger diameter tires and the typical mechanical interconnection between the axles would raise the baler too high off the ground. Further, certain axle arrangements may substantially interfere with the knotter cycle because they may require the lower tensioning device to be moved to a less than ideal location on the frame, which can correspondingly significantly hinder the tensioning ability of the lower tensioning device.

What is needed in the art is an agricultural baler that can effectively traverse over uneven ground while at the same time allowing the use of different or larger diameter tires without hindering the tensioning ability of the lower tensioning device.

SUMMARY OF THE INVENTION

The present invention provides an agricultural baler with front and rear axles and a tying assembly configured for tying twine around the bale. The tying assembly includes an upper tensioner device and a lower tensioner device which tension respective runs of the twine. The first axle is pivotally connected to the chassis of the agricultural baler and the lower tensioner device is fixedly attached to the first axle.

The invention in one form is directed to an agricultural baler, including a chassis, an axle system coupled with the chassis, a main bale chamber carried by the chassis, and a tying assembly configured for tying a twine around a bale within the main bale chamber. The tying assembly includes a plurality of knotters supported by the chassis, a needle yoke having a plurality of needles coupled thereto, and an upper tensioner device and a lower tensioner device located underneath the upper tensioner device. The agricultural baler is characterized in that the axle system includes a first axle carrying ground engaging wheels and the lower tensioner device is attached to the first axle and correspondingly moves with the first axle.

In another embodiment, the lower tensioner device includes a mounting bracket fixedly attached to the first axle.

In another embodiment, the mounting bracket includes a first set of mounting features, a second set of mounting features, and a third set of mounting features.

In another embodiment, the mounting bracket is comprised of a C-bracket with an upper member, a side member, and a lower member, and the first set of mounting features are connected to and extend above the upper member, the second set of mounting features are connected to the side member, and the third set of mounting features are connected to and extend below the lower member.

In another embodiment, the lower tensioner device further includes a plurality of clamps mounted to the first set of mounting features, a plurality of biasing members mounted to the second set of mounting features, and a plurality of tension arms pivotally mounted to the third set of mounting features and connected to the plurality of biasing members.

In another embodiment, the first axle is pivotable between a first position and a second position, and the plurality of tension arms are configured for catching a slack in the twine as the first axle pivots from the first position to the second position.

In another embodiment, the lower tensioner device is located underneath the main bale chamber and directly underneath the plurality of needles.

In another embodiment, the axle system includes the first axle and a second axle disposed rearwardly of the first axle.

In another embodiment, the agricultural baler further includes at least one elongate member interconnecting the second axle with the first axle to accommodate generally horizontal loads on the second axle.

In another embodiment, the at least one elongate member comprises a tube extending between the second axle and the first axle, and further including a pair of angled braces, each said brace extending from the tube toward the second axle, thereby forming a generally triangular shaped reinforcement structure.

In another embodiment, the at least one elongate member is coupled with the first axle via a pivotal connection or a rigid connection.

In another embodiment, the agricultural baler further includes a first pair of suspension cylinders connected to the first axle and to the chassis and a second pair of suspension cylinders connected to the second axle and to the chassis, and the first and second pairs of suspension cylinders accommodating generally vertical loads.

In another embodiment, the agricultural baler further includes a feeding channel supported by the chassis, and wherein the first axle includes a pair of leaf springs positioned at respective opposite ends of the first axle, the feeding channel defining a structural member which is coupled with the chassis, and wherein the leaf springs of the first axle are pivotally coupled with the feeding channel, and thereby indirectly coupled to the chassis by way of the feeding channel.

In another embodiment, each leaf spring is a generally horizontally arranged leaf spring so that each leaf spring provides a respective lateral stabilization of the first axle.

In another embodiment, the first axle is mounted rearwardly of the feeding channel, thereby lowering an effective axle height of the first axle.

BRIEF DESCRIPTION OF THE DRAWINGS

The above-mentioned and other features and advantages of this invention, and the manner of attaining them, will become more apparent and the invention will be better understood by reference to the following description of embodiments of the invention taken in conjunction with the accompanying drawings, wherein.

Corresponding reference characters indicate corresponding parts throughout the several views. The exemplifications set out herein illustrate embodiments of the invention and such exemplifications are not to be construed as limiting the scope of the invention in any manner.

DETAILED DESCRIPTION OF THE INVENTION

Figure 1:
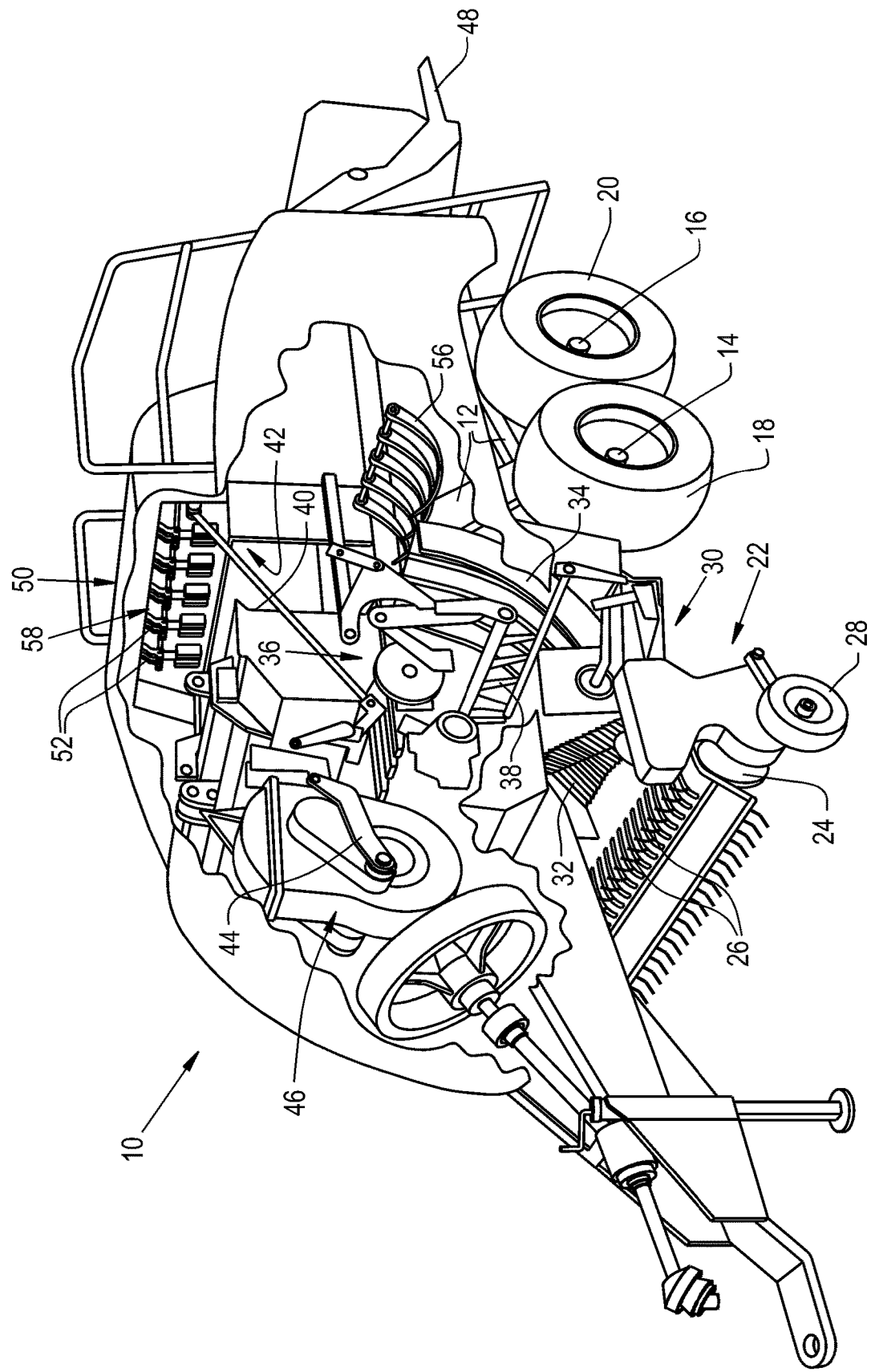
FIG. 1 is a perspective cutaway view illustrating an embodiment of a large square baler that includes an axle system and a lower tensioner device that is attached to the axle system.
Figure 2:
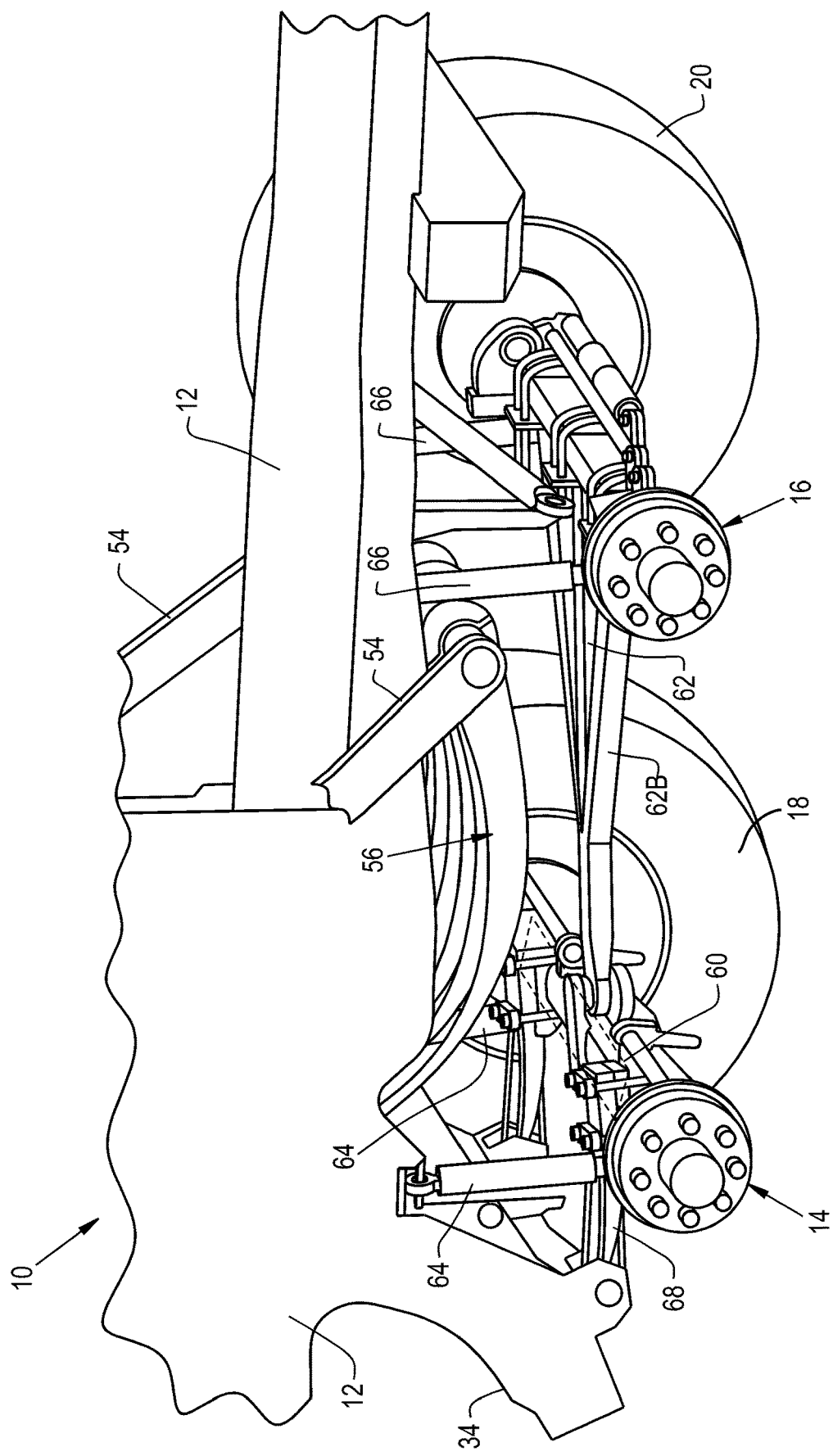
FIG. 2 is a side perspective view of a portion of the baler.

Referring now to the drawings, and more particularly to FIGS. 1-2, there is shown a large square baler 10, which can be connected to and pulled behind an agricultural vehicle, such as a tractor (not shown). The baler 10 includes a chassis 12, an axle system 14, 16 with a first, front axle 14 and a second, rear axle 16, and a first and second pair of wheels 18, 20 for carrying a number of baler components (described below).

The baler 10 may operate on a two-stage feeding system. Crop material is lifted from windrows into the baler 10 using a pickup unit 22. The pickup unit 22 may include a rotating pickup roll 24 with tines 26, one or more conveying rollers or stub augers (unnumbered), and/or a guide wheel 28. From the pickup unit 22, the crop material is transported to a packer unit 30 which generally includes packer tines 32 which push and intertwine the crop material together into a feeding channel 34 to form a wad of crop material. The feeding channel 34 and packer tines 32 function as the first stage for crop material compression.

Once the pressure in the feeding channel 34 reaches a predetermined sensed value, a stuffer unit 36 moves the wad of crop material upwardly from the feeding channel 34. The stuffer unit 36 includes stuffer forks 38 which thrust the wad of crop directly in front of a plunger 40. The plunger 40 reciprocates within a main bale chamber 42 via a crank arm 44 and drive 46, which may be operably coupled to a PTO of an agricultural vehicle. The stuffer forks 38 return to their original stationary state after the wad of material has been moved into the main bale chamber 42. The plunger 40 compresses the wads of crop material into flakes to form a bale and, at the same time, gradually advances the bale toward an outlet 48 of main bale chamber 42. Together, the plunger 40 and the main bale chamber 42 function as the second stage for crop compression. When enough flakes have been added and the bale reaches a full (or other predetermined) size, a tying assembly 50 is actuated in order to wrap and tie twine around the bale while it is still in the main bale chamber 42.

The tying assembly 50 is configured for wrapping a series of twine loops, formed from upper and lower twine runs, around each bale as it moves through the main bale chamber 42. The tying assembly 50 may include knotters 52 supported by the chassis 12, a needle yoke 54 having a plurality of needles 56 coupled thereto, an upper tensioner device 58, and a lower tensioner device 60 located underneath the upper tensioner device 58. In the cycle of the tying assembly 50, the knotters 52, which are generally located at the top of the main bale chamber 42, include rotating billhooks (not shown) for tying each respective run of twine together. The needles 56 are generally located below the main bale chamber 42 and are associated with the lower run of twine. The needle yoke 54 moves the needles 56 in an arced travel path in which the needles 56 pass in between correspondingly spaced slots in the main bale chamber 42 to transport the lower run of twine up to the knotters 52. In this regard, the knotters 52 and needles 56 may operate in a known manner to tie each bale. Additionally, the upper tensioner device 58 may include upper tensioners which operate in a known manner to tension the twine. The lower tensioner 60 device, described further herein, can be attached to any one of the axles in the axle system, such as to the first axle 14 or the second axle 16.

According to an aspect of the present invention, and referring now specifically to FIG. 2, the first axle 14 can be pivotally connected to the chassis 12, and the second axle 16 can be connected to the first axle 14, allowing the axles 14, 16 to be positioned below the needles 56, and thereby reducing the profile of the agricultural baler 10. The agricultural baler 10 may further include at least one elongate member 62 connecting the axles 14, 16, a first and second pair of suspension cylinders 64, 66, and/or at least one front leaf spring 68 associated with the first axle 14.

The at least one elongate member 62 interconnects the second axle 16 with the first axle 14 to accommodate generally horizontal loads on the second axle 16. The at least one elongate member 62 can be, e.g., in the form of a rectangular tube 62 extending between the second axle 16 and the first axle 14. The elongate member 62 can also be formed as a tube with any desired cross section, e.g. with a round, square, rectangular, etc., cross section, a solid rod, an angle iron, a C-channel, etc. Moreover, the tube 62 can be hollow or solid. It is conceivable that each elongate member 62 may be configured as a leaf spring. The particular configuration of the leaf spring can vary from one application to another, such as the number of leaves making up the leaf spring, dimensions of the leaf spring, type of material, etc.

A pair of angled braces 62B can extend from the tube 62 toward a respective end of the second axle 16, thereby forming a generally triangular shaped reinforcement structure. The angled braces 62B support the outboard ends of the second axle 16, and other types or shapes of support or reinforcement structures may also be possible. The interconnection between the angled braces 62B and the second axle 16 and/or elongate member 62 can vary, such as a bolted connection, welded connection, ball joints, etc.

The elongate member 62 can include a forward end that is coupled with the first axle 14 via a movable connection such as a ball joint (unnumbered). The ball joint can include a generally vertical (or horizontal) pivot axis and allows both vertical and horizontal movement between the first and second axles 14 and 16. However, each elongate member 62 can be coupled at the respective opposite ends via any suitable connection with the first axle 14 and the second axle 16. For example, each elongate member 62 can be coupled with the first axle 14 via respective pivotal connections, and can be coupled with the second axle 16 via respective rigid connections, or vice versa.

The first and second pair of suspension cylinders 64, 66 may connect each lateral end of the first and second axles 14, 16 to the chassis 12, directly or indirectly. The suspension cylinders 64, 66 are generally vertically arranged so the suspension cylinders 64, 66 accommodate generally vertical loads, such as the weight of the bale(s) and the dynamic vertical loads as the agricultural baler 10 traverses a field. The suspension cylinders 64, 66 can be in the form of any desired pneumatic or hydraulic cylinder.

The leaf springs 68 interconnect the lateral ends of the first axle 14 to the chassis 12 in order to accommodate generally horizontal loads. This interconnection between the first axle 14 and the chassis 12 can be direct or indirect. For example, in one embodiment, the feeding channel 34 can define a structural member which is coupled with the chassis 12. This is in contrast with conventional designs, wherein the feeding channel 34 is a non-structural component made of light metal which directs the crop material into the main bale chamber 42. The leaf springs 68 are pivotally coupled with the feeding channel 34 (FIG. 2); and thereby, the first axle 14 is indirectly coupled to the chassis 12 by way of the feeding channel 34. The first axle 14 can be mounted rearwardly of the feeding channel 34, which in turn lowers an effective axle height of the agricultural baler 10. The leaf springs 68 are generally horizontally arranged leaf springs 68. It may be possible in other applications, however, to arrange the leaf springs 68 other than horizontally. Moreover, in the embodiment of the present invention shown in the drawings, each of the leaf springs 68 provide lateral stabilization of the first axle 14; however, it may be possible in other applications to provide the lateral support with other structures, such as tie rods extending between the chassis 12 and the first axle 14.

The motion of the needle yoke 54 may interfere with the attachment of the first and/or rear axles 14, 16 to the chassis 12. An inverted Y yoke or bogie arrangement at the outboard ends of the second axle 16 may not be possible or feasible. For example, as shown in FIG. 2, the agricultural baler 10 may not include a bogie arrangement, and the second axle 16 is coupled with the first axle 14 to accommodate the generally horizontal loads. However, the baler 10 can have any desired axle arrangement, for example, a tandem system or a bogie system.

Since the present embodiment shows the first and second axles 14, 16 directly underneath the needle yoke 54 and needles 56, the lower tensioner device 60 may be attached to the first or rear axle 14, 16 instead of onto a portion of the frame, as is typical in conventional designs. As shown in FIG. 2, the lower tensioner device 60 is fixedly attached to the first axle 14 and correspondingly moves with the motion of the first axle 14 as it pivots throughout its respective positions. Hence, the lower tensioner device 60 is also located underneath the main bale chamber 42 and directly underneath the tips of the needles 56.

Figure 3:
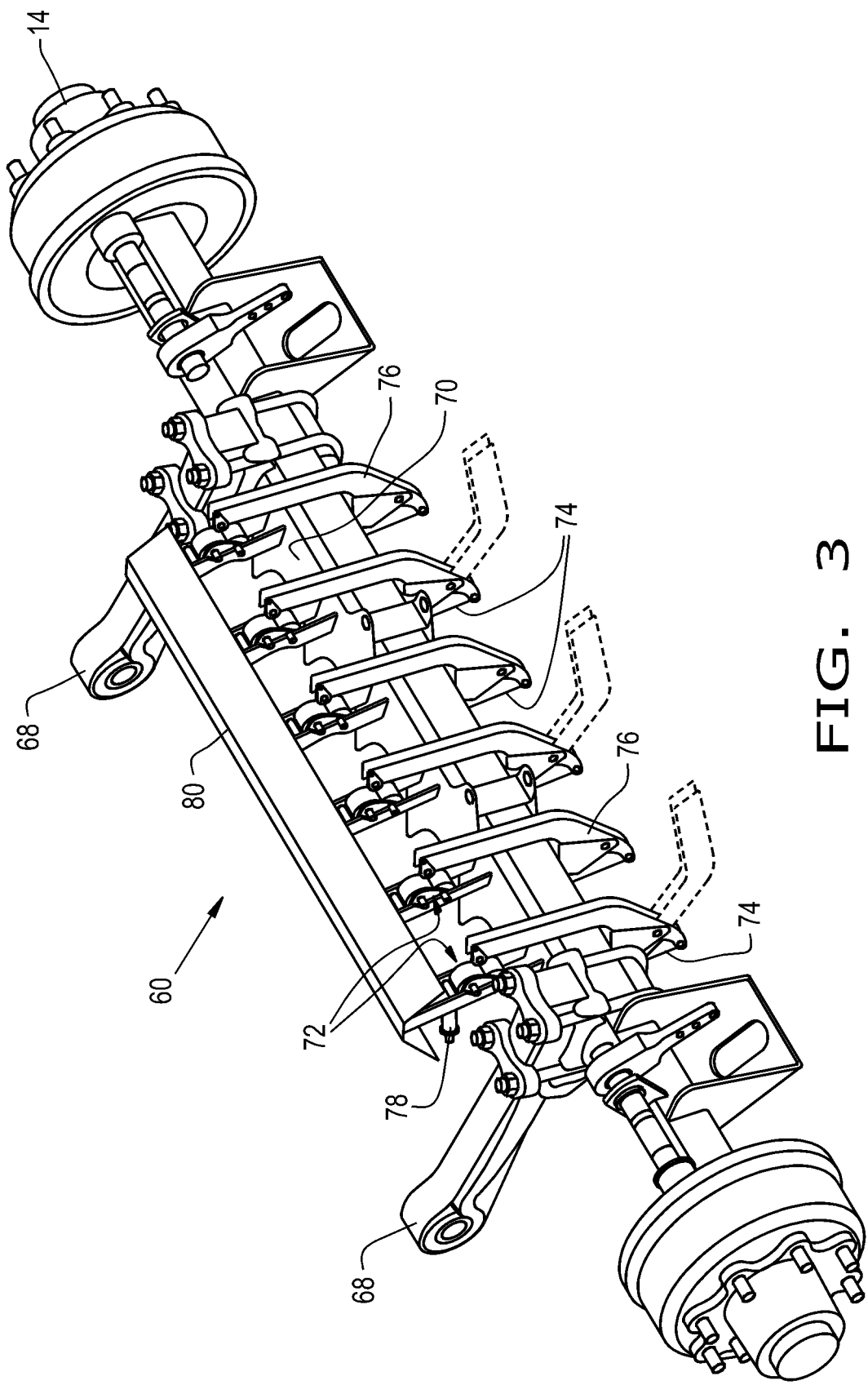
FIG. 3 is a perspective view of the lower tensioner device attached to the first axle.
Figure 4:
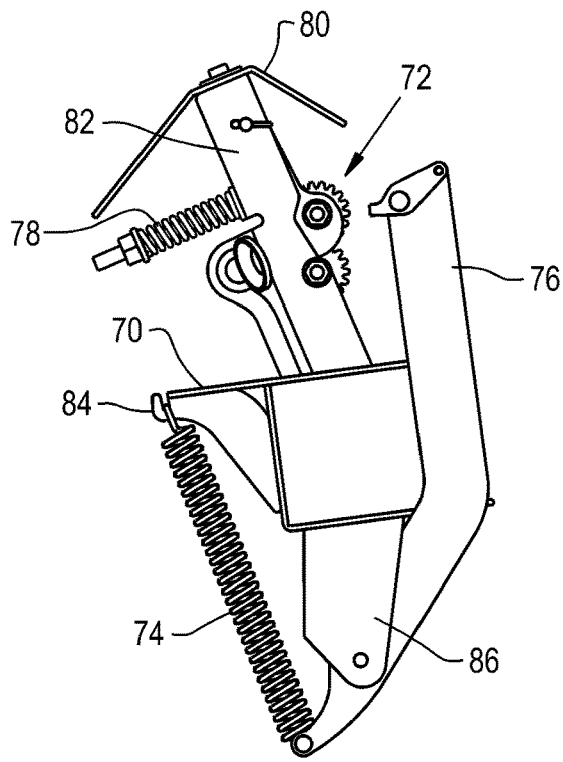
FIG. 4 is a side view of the lower tensioner device.
Figure 5:
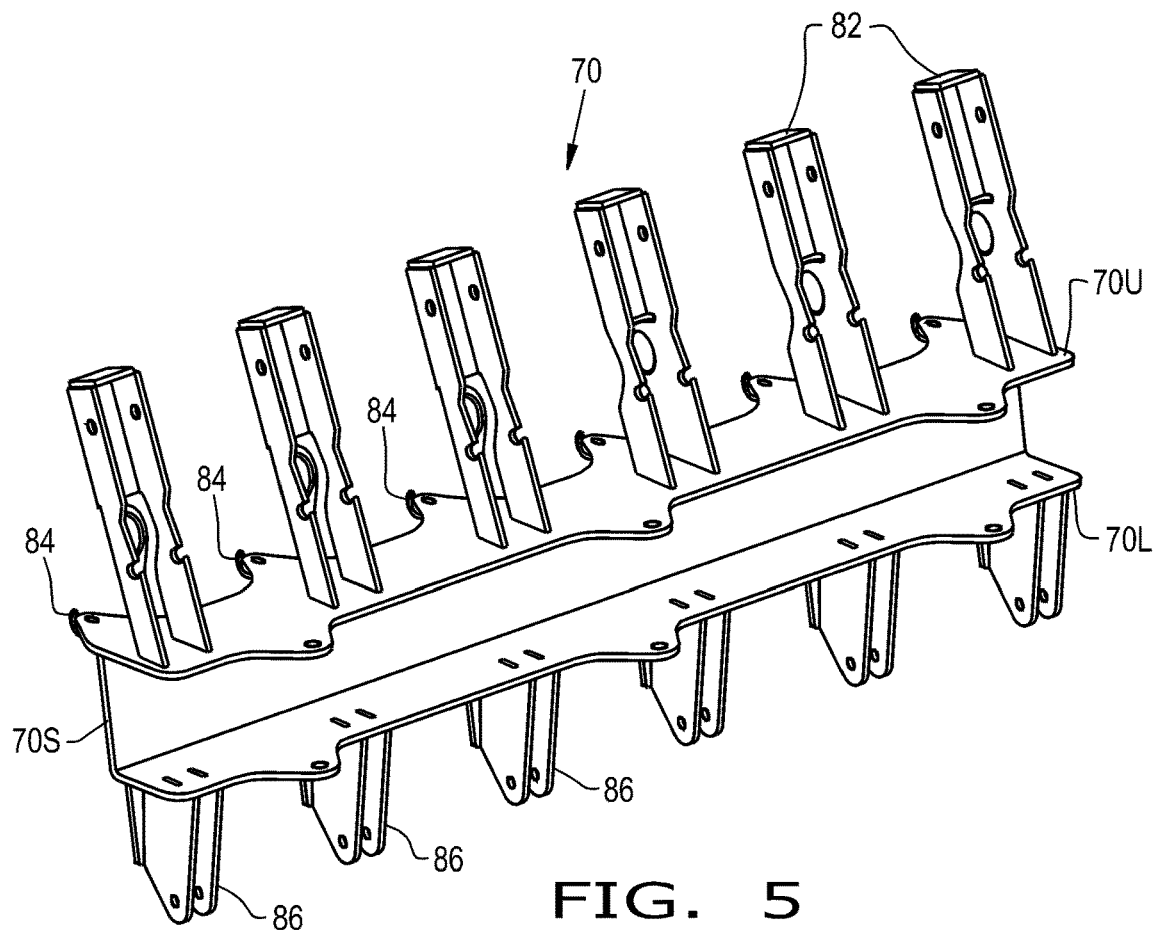
FIG. 5 is a perspective view of the mounting bracket of the lower tensioner device.

Referring now to FIGS. 3-5, there is shown the lower tensioner device 60 in greater detail. The lower tensioner device 60 can include a mounting bracket 70 that fixedly attaches to the first axle 14 or second axle 16, and tensioners that are composed of clamps 72, biasing members 74, and tensioning members 76 for tensioning the twine. The lower tensioner device 60 may also include adjustment members 78 and a top plate 80 to substantially cover or otherwise protect the top portion of the lower tensioner device 60.

The mounting bracket 70 can be composed of a C-bracket 70 with an upper member 70U, a side member 70S, and a lower member 70L. The mounting bracket 70 may further include a first set mounting features 82, a second set of mounting features 84, and a third set of mounting features 86 that are respectively in the form of upper brackets 82 connected to and extending above the upper member 70U, side brackets 84 connected to the side member 70S and extending outwardly therefrom, and lower brackets 86 that are connected to and extending below the lower member 70L (FIG. 5). In turn, the clamps 72 are mounted to the upper brackets 82, the biasing members 74 are mounted to the side brackets 84, and the tensioning arms 76 are pivotally mounted to the lower brackets 86 and to the biasing members 74. The brackets 82, 84, and/or 86 may be formed integrally with the mounting bracket 70 or may be removably or fixedly attached to the mounting bracket 70. For example, the brackets 82, 84, 86 can be welded or fastened to the mounting bracket 70.

Each clamp 72 may include a pair of cogs for metering a respective run of twine as it is drawn from the twine roll and through a respective guide ring (unnumbered). The biasing members 74 may be in the form of coil springs 74. The biasing members 74 may hook onto the ends of the side brackets 84 at one end and may pivotally couple with the tensioning arms 76 at the other end. Each tensioning arm 76 is pivotally connected to the lower bracket 84. The upper end of each tensioning arm 76 may include a roller around which the twine passes, and the lower end of the tensioning arm 76 is pivotally coupled with biasing member 74, which biases the tensioning arm 76 in a direction to catch or take up slack in the respective runs of twine. Thereby, the tensioning arms 76 can be rotated, for example between a first position and a second position (shown in phantom in FIG. 3), in order to catch up slack in the twine during operation of the knotters 52 and needles 56. For example, the tensioning arms may catch 400 mm to 700 mm of slack twine, such as approximately 685 mm of slack twine, plus or minus 10 mm.

Figure 6:
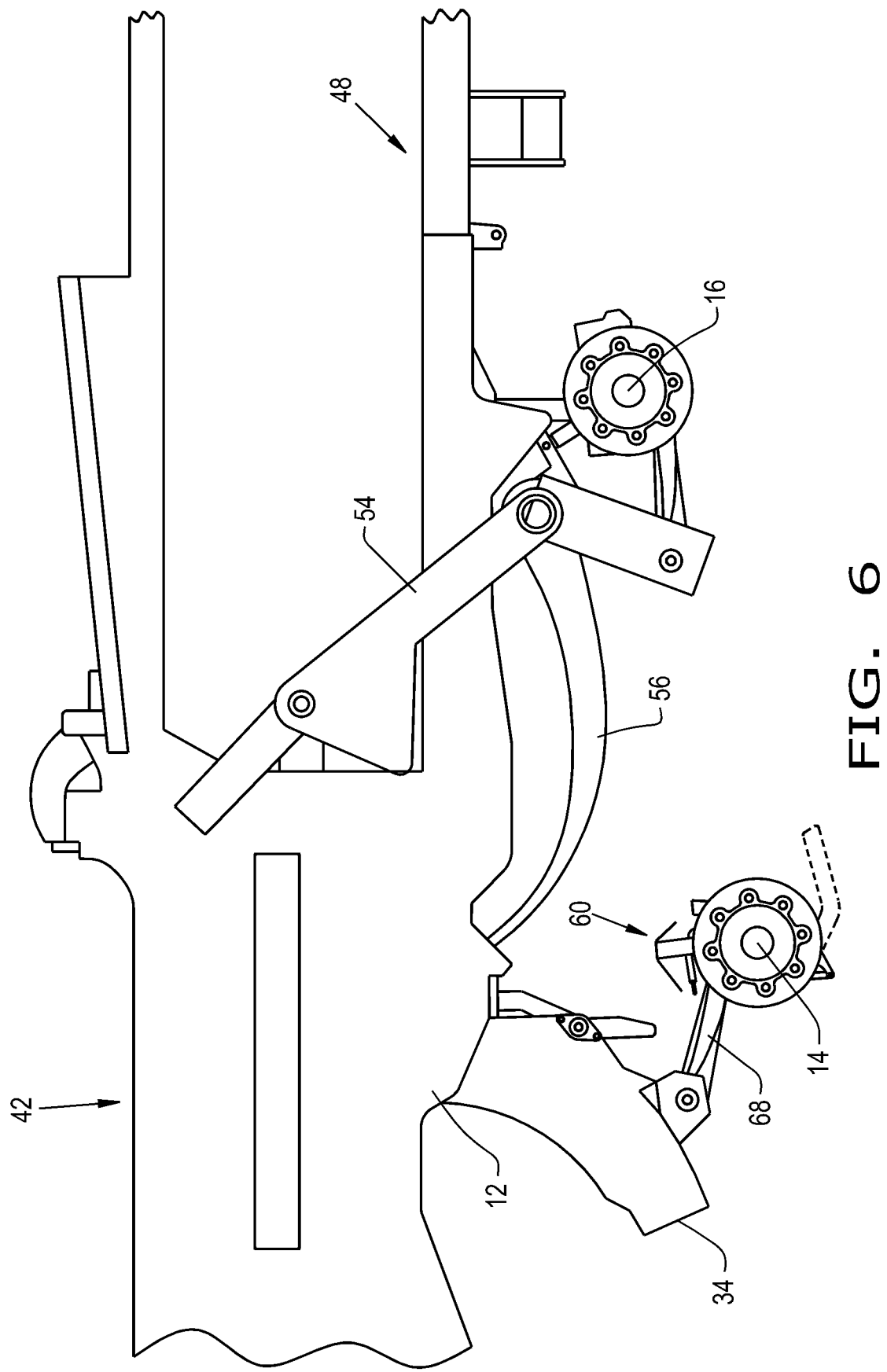
FIG. 6 is a side view of a portion of the baler with the first axle in a lowered position.
Figure 7:
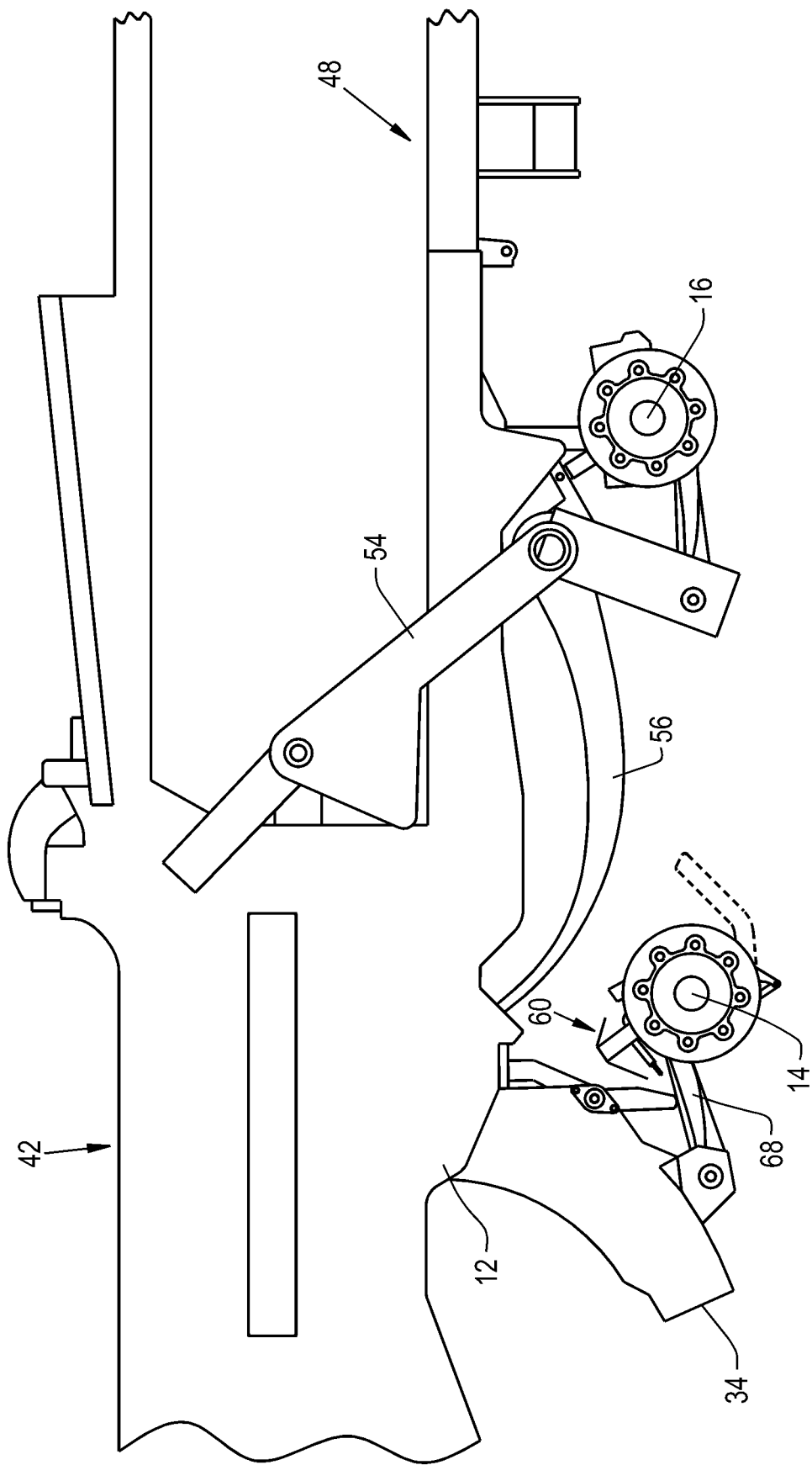
FIG. 7 is a side view of a portion of the baler with the first axle in a raised position.

Referring now to FIGS. 6-7, there is shown the agricultural baler 10 in a first and second position in which the first axle 14 is in a first, lowered position (FIG. 6) and a second, raised position (FIG. 7). It should be appreciated that the first axle 14 can be pivoted between a multitude of positions, and, for example, the first position may be a middle position and the second position may be a raised position. It should also be appreciated that the axles 14, 16 may mount various sized wheels. For instance, the first axle 14 may be pivoted between certain positions in order to mount various sized wheels. In more detail, the first axle 14 can mount large or small wheels, within a range of positions such that the ground clearance of the agricultural baler 10 can range from 250 mm to 400 mm.

As discussed above, the tensioning arms 76 are configured for catching the slack in the twine during operation of the knotters 52 and needles 56, and further, the tensioning arms 76 can also catch the slack in the twine as the first axle 14 pivots from the first position to the second position. For example, when the first axle 14 is pivoted from its lowest position to its highest, raised position, the tensioning arms 76 can catch 400-700 mm of slack twine, such as 410 mm or 500 mm of slack twine. Additionally, for example, when the first axle 14 is pivoted from a middle position to its highest, raised position, the tensioning arms 76 may catch 400-700 mm of slack twine, such as 560 mm of slack twine.

In the embodiment shown and described above, the agricultural baler 10 includes the first axle 14 and the second axle 16. However, it may be possible to configure the axle arrangement of the present invention with more than two axles, e.g., three, four, or more axles. For example, it may be possible to configure the axle arrangement of the present invention with three axles, with the third axle coupled to the second axle by way of another one or more elongate member(s) interconnecting the third axle (not shown) with the second axle to accommodate generally horizontal loads on the third axle. Thus, the concepts of the present invention can be extended to an axle arrangement with two or more axles. It should be appreciated that since the axle system 14, 16 can have any desired axle arrangement, such as a tandem or bogie axle arrangement, and any number of axles and that the lower tensioner device 60 can be connected to any desired axle of the axle system 14, 16.

While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. An agricultural baler, comprising:
   a chassis;
   an axle system coupled with the chassis and including a first axle;
   a main bale chamber carried by the chassis; and
   a tying assembly including:
      a plurality of knotters supported by the chassis;
      a needle yoke having a plurality of needles coupled thereto; and
      an upper tensioner device and a lower tensioner device, the lower tensioner device being located underneath the upper tensioner device, wherein the lower tensioner device is directly attached to the first axle via a mounting bracket which includes a base bracket fixedly attached to the first axle, wherein the base bracket surrounds the first axle on three sides along a length of the first axle, and wherein the lower tensioner device moves with the first axle as the first axle pivots between a plurality of positions relative to the chassis.

2. The agricultural baler of claim 1, wherein the mounting bracket further includes a lower bracket and a tension arm, the lower bracket being connected to and extending below the base bracket, the tension arm being pivotally mounted to the lower bracket.

3. The agricultural baler of claim 2, wherein the mounting bracket includes a first set of mounting features, a second set of mounting features, and a third set of mounting features, the third set of mounting features including the lower bracket.

4. The agricultural baler of claim 3, wherein the base bracket is a C-bracket with an upper member, a side member, and a lower member, wherein both the upper member and the lower member extend along the length of the first axle, and the first set of mounting features are connected to and extend above the upper member, the second set of mounting features are connected to the side member, and the third set of mounting features are connected to and extend below the lower member.

5. The agricultural baler of claim 3, wherein the lower tensioner device further includes a plurality of clamps mounted to the first set of mounting features, a plurality of biasing members mounted to the second set of mounting features, and a plurality of tension arms pivotally mounted to the third set of mounting features and connected to the plurality of biasing members.

6. The agricultural baler of claim 5, wherein the first axle is pivotable between a first position and a second position relative to the chassis.

7. The agricultural baler of claim 1, wherein the lower tensioner device is located underneath the main bale chamber and directly underneath the plurality of needles.

8. The agricultural baler of claim 1, wherein the axle system includes the first axle and a second axle disposed rearwardly of the first axle.

9. The agricultural baler of claim 8, further including at least one elongate member interconnecting the second axle with the first axle to accommodate generally horizontal loads on the second axle.

10. The agricultural baler of claim 9, wherein the at least one elongate member comprises a tube extending between the second axle and the first axle, and further including a pair of angled braces, each said brace extending from the tube toward the second axle, thereby forming a generally triangular shaped reinforcement structure.

11. The agricultural baler of claim 9, wherein the at least one elongate member is coupled with the first axle and the second axle via a pivotal connection or a rigid connection, respectively.

12. The agricultural baler of claim 8, further comprising a first pair of suspension cylinders connected to the first axle and to the chassis and a second pair of suspension cylinders connected to the second axle and to the chassis, and the first and second pairs of suspension cylinders accommodating generally vertical loads.

13. The agricultural baler of claim 8, further comprising a feeding channel supported by the chassis, and wherein the first axle includes a pair of leaf springs positioned at respective opposite ends of the first axle, the feeding channel defining a structural member which is coupled with the chassis, and wherein the leaf springs of the first axle are pivotally coupled with the feeding channel, and thereby indirectly coupled to the chassis by way of the feeding channel.

14. The agricultural baler of claim 13, wherein the first axle is mounted rearwardly of the feeding channel.

15. The agricultural baler of claim 1, wherein the lower tensioner device further comprises adjustment members and a top plate configured to cover a top portion of the lower tensioner device.

* * * * *